United States Patent [19]
Nagamatsu

[11] 3,719,457
[45] March 6, 1973

[54] CATALYTIC CONVERTER STRUCTURE

[75] Inventor: Brian H. Nagamatsu, Plymouth, Mich.

[73] Assignee: Ford Motor Company, Dearborn, Mich.

[22] Filed: April 26, 1971

[21] Appl. No.: 137,349

[52] U.S. Cl. ................ 23/288 F, 60/299, 60/301, 60/307, 423/213
[51] Int. Cl. ........................... F01n 3/14, B01j 9/04
[58] Field of Search ........ 23/288 F, 2 E; 60/299, 301, 60/307

[56] References Cited

UNITED STATES PATENTS

| | | | |
|---|---|---|---|
| 2,288,943 | 7/1942 | Eastman | 23/288 F |
| 3,172,251 | 3/1965 | Johnson | 23/288 F X |
| 3,228,755 | 1/1966 | Lottinville | 23/288 F X |
| 3,544,264 | 12/1970 | Hardison | 23/2 E |
| 3,556,735 | 1/1971 | Epelman | 23/288 F |
| 3,587,210 | 6/1971 | Shinner | 23/288 F X |
| 3,615,255 | 10/1971 | Patterson et al. | 23/288 F |

*Primary Examiner*—Barry S. Richman
*Attorney*—John R. Faulkner and Robert W. Brown

[57] ABSTRACT

A catalytic converter for engine exhaust gas purification is described. The catalytic converter includes a housing having an inlet and an outlet. Upstream and downstream particulate catalytic material retention baffles are located between the inlet and outlet. Positioned in the flow channel between the housing inlet and the upstream catalyst retention baffle is a flow-control baffle having a plurality of substantially uniformly spaced openings therein, the openings being present over substantially the entire surface area of the baffle. Attrition of the particulate catalytic material is reduced.

2 Claims, 6 Drawing Figures

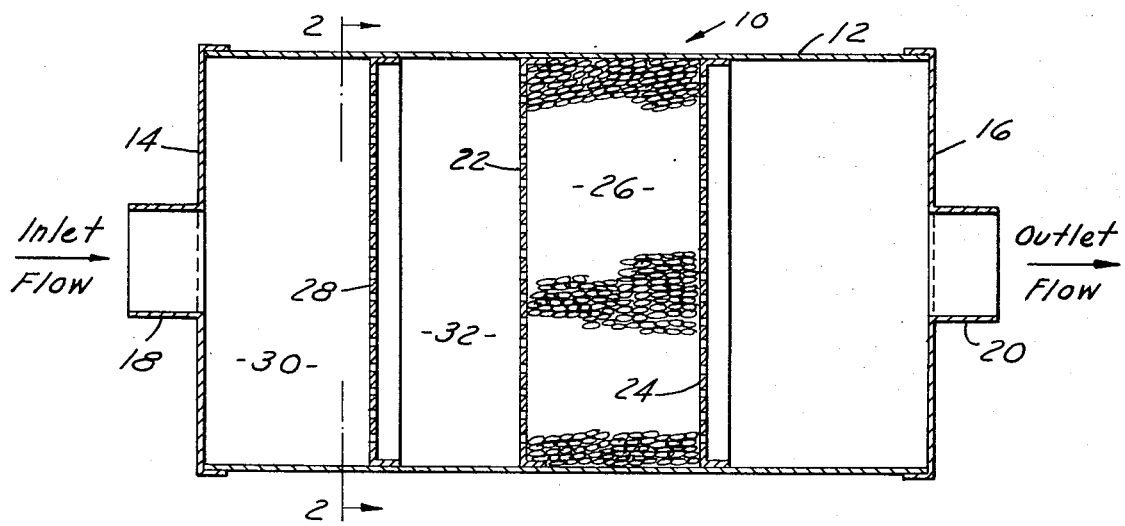
FIG. 1
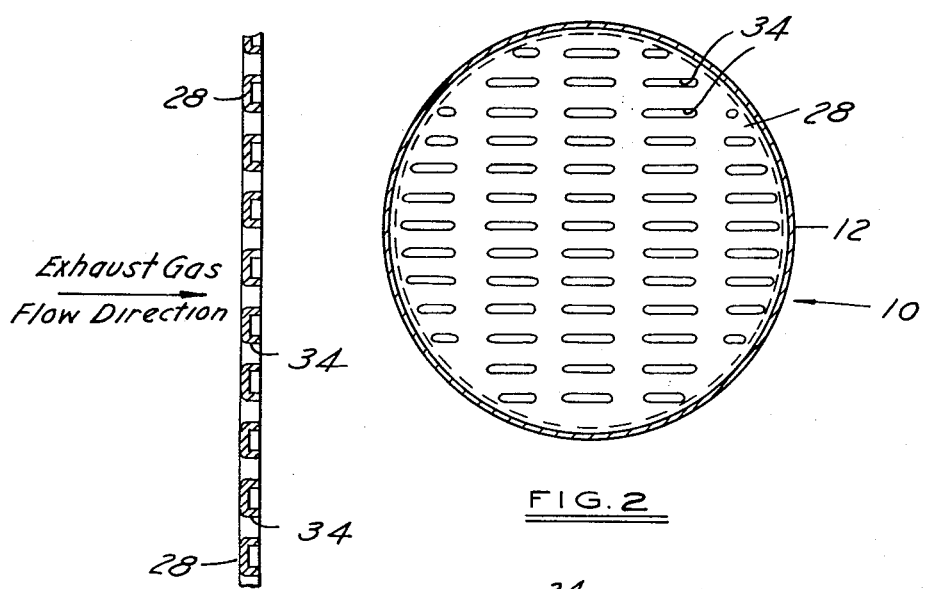
FIG. 4
FIG. 2
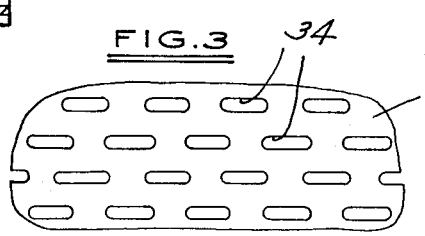
FIG. 3
INVENTOR
BRIAN H. NAGAMATSU
BY John R. Faulkner
Robert W. Brown
ATTORNEYS INVENTOR
BRIAN H. NAGAMATSU
BY John R. Faulkner
Robert W. Brown
ATTORNEYS

CATALYTIC CONVERTER STRUCTURE

BACKGROUND OF THE INVENTION

The present invention relates to a basic design improvement for catalytic converters for the purification of motor vehicle exhaust gases. More particularly, the invention relates to a design for the reduction of particulate catalytic material attrition.

The exhaust gases emanating from motor vehicles equipped with internal combustion engines are mixtures of gases including unburned hydrocarbons, nitrogen oxides, carbon monoxide, and others. The presence of smog in densely populated areas has been attributed to such exhaust gases. For this reason, it has been proposed that catalytic converters be used for the purification of these exhaust gases. The catalyst within the converter aids in the selective oxidation or reduction of certain of the exhaust gas constituents. The use of more than one catalytic material may be required to obtain the necessary exhaust gas purification.

A variety of physical forms are possible for the catalytic materials used in catalytic converters. The invention, however, is concerned primarily with catalysts in the form of particles. The term "particles" as used herein is to be construed broadly and includes catalytic materials ranging in size from minute particles to pellets.

One of the problems associated with the use of a particulate catalytic material in a motor vehicle catalytic converter is that of attrition of the catalyst. The term "catalyst attrition" refers to the physical loss of a portion of the catalytic material. Such attrition is believed to result from a rubbing together or grinding of the catalyst particles and from the impingement of such particles upon the catalytic converter housing and upon the means used to retain the particulate catalytic material in the converter housing. Specifically, the inventor has found, as a result of studies of exhaust gas flow through catalytic converters, that the converters of previously known design are subject to substantial exhaust gas swirl that is believed to cause a substantial amount of particulate catalytic material attrition.

SUMMARY OF THE INVENTION

The improved catalytic converter of the invention is intended to substantially reduce particulate catalytic material attrition. In accordance with the invention, a catalytic converter for the purification of exhaust gases emanating from an internal combustion engine includes a housing having an inlet for the admission of exhaust gases into the converter and having an outlet to permit exhaust gases to exit from it. The housing has included within it means defining a flow channel between the inlet and the outlet. Upstream and downstream gas-permeable baffles or the like are positioned within the flow channel for the retention between them of a particulate catalytic material. The space between the upstream and downstream baffles is occupied by a particulate catalytic material that forms a catalyst bed. A principal feature of the invention resides in the use of a gas-permeable flow-control baffle. This flow-control baffle is positioned within the housing flow channel between, and spaced from both, the housing inlet and the upstream gas-permeable baffle.

The flow-control baffle has a plurality of substantially uniformly spaced openings therein for the passage of exhaust gases therethrough. The openings are present over substantially the entire surface area of the baffle. The function of the flow-control baffle is to reduce exhaust gas turbulence and velocity inequalities in the region between the flow-control baffle and the catalyst bed. This results in a substantial reduction of particulate catalytic material attrition in the catalytic converter.

BRIEF DESCRIPTION OF THE DRAWINGS

FIG. 1 is a diagrammatic sectional view of an axial flow catalytic converter and is illustrative of the principal features of the invention;

FIG. 2 is a diagrammatic sectional view taken along the line 2—2 of FIG. 1 and illustrates the openings in the flow-control baffle;

FIG. 3 is a partial sectional view showing an alternative arrangement for the openings in the flow-control baffle;

FIG. 4 is a sectional view taken through a flow-control baffle and illustrates another design possibility for the baffle openings;

DETAILED DESCRIPTION OF THE INVENTION

Figure 5:
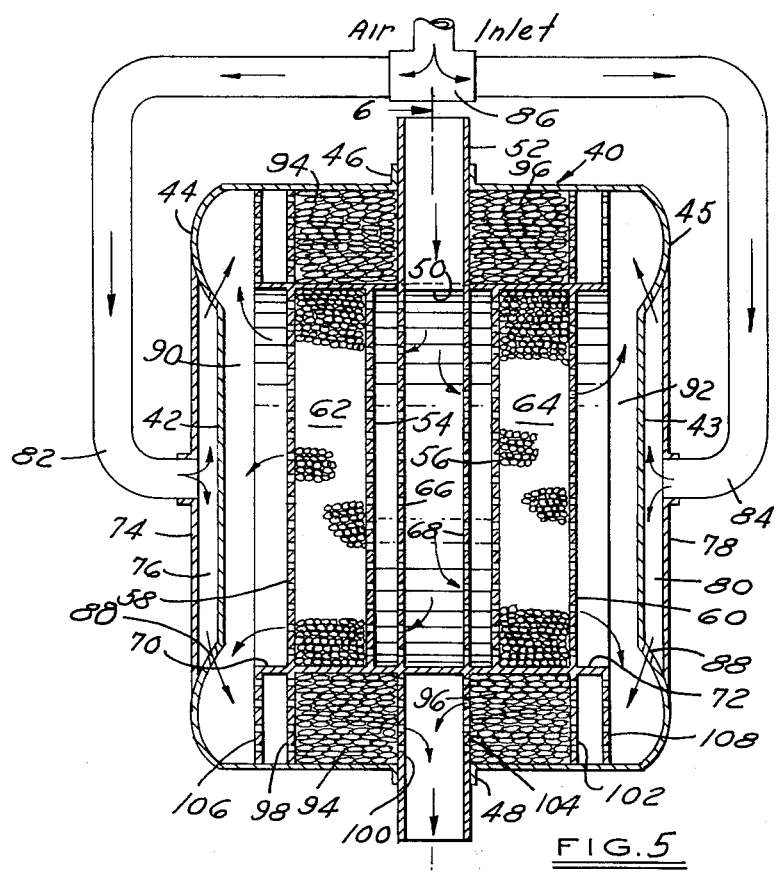
FIG. 5 is a sectional view of a multiple-bed catalytic converter which utilizes features of the present invention.

With particular reference now to the diagrammatic sectional view of FIG. 1, an axial-flow catalytic converter, shown generally at 10, comprises a cylindrical housing 12 having end plates 14 and 16. The housing end plate 14 has an exhaust gas inlet pipe 18 attached to it, and the housing end plate 16 has an exhaust gas outlet pipe 20 attached to it. Thus, the catalytic converter housing has an exhaust gas inlet and an exhaust gas outlet with a flow channel defined within the housing between the inlet and outlet openings.

Positioned within the housing 12 is a gas-permeable upstream baffle 22 for the retention of a particulate catalytic material. A downstream gas-permeable baffle 24 is also positioned within the flow channel between the upstream baffle and the outlet pipe 20 for the retention of a particulate catalytic material. A catalyst bed 26 formed by particulate catalytic material occupies the space defined between the upstream baffle 22 and the downstream baffle 24. A flow-control baffle 28 is positioned within the flow channel of the housing 12 between, and spaced from both, the housing inlet 18 and the upstream catalyst retention baffle 22.

In operation, exhaust gases emanating from the internal combustion engine to which the catalytic converter 10 is attached enter the converter through the inlet 18. These gases then occupy the chamber 30 and pass through the flow control baffle 28. The flow pattern of the gases in the chamber 30 is quite turbulent. The flow-control baffle 28 serves the purpose of straightening this flow and reducing its turbulence so that the gas velocity distribution in the region 32 between the flow-control baffle 28 and the upstream catalyst retention baffle 22 is more uniform. Exhaust gases pass from the region 32 through the upstream catalyst retention baffle 22, into the catalyst bed 26, through the downstream catalyst retention baffle 24, and then exit from the converter through the outlet 20.

The flow-control baffle 28 has a plurality of substantially uniformly spaced openings therein for the passage of exhaust gases therethrough. The openings are present over substantially the entire baffle surface area. The openings in the baffle 28 may be circular in shape or otherwise. Preferably, these openings are oblong slots as illustrated in FIG. 2. If oblong slots are employed for the flow-control baffle 28, these slots may be arranged in vertical alignment as illustrated in FIG. 2, or they may be arranged in the alternately offset pattern illustrated in FIG. 3.

If substantially circular openings are used in the flow-control baffle 28, they preferably will have a diameter of less than one-eighth of an inch. With respect to the use of oblong slots for the openings in the flow-control baffle 28, very satisfactory results have been obtained where the slots have a maximum width of about 0.050 of an inch and where they have a length in the range from about 0.2 to 0.4 of an inch. The length of the oblong slots is of lesser importance than the width of such slots. Generally speaking, the smaller the size of the flow-control baffle openings 34 and the greater their number, the better the results with respect to reduction of attrition of the particulate catalytic material in the catalytic converter. It is believed that the total open area formed by the openings 34 in the flow control baffle 28 should be within the range from about 25 to 45 percent of the total surface area of the baffle 28. A total open area greater than about 45 percent would be likely to have insufficient strength to withstand the thermal stresses placed on it during operation of the converter. A total open area below about 25 percent, on the other hand, would be likely to be insufficient to substantially reduce attrition of the particulate catalytic material. The inventor has found that a total open area in the flow-control baffle 28 of about 35 percent of the baffle surface area is quite satisfactory in most applications.

The flow-control baffle 28 must be made from a material capable of withstanding temperatures normally encountered in a catalytic converter. These temperatures may be as high as about 1,500° F. Various stainless steels capable of withstanding such temperatures are available and have been employed by the inventor. The thickness of the metal from which the flow-control baffle 28 is made, for example, may be about 0.030 of an inch. It is preferred that the upstream and downstream catalyst retention baffles 22 and 24, respectively, be constructed in a manner similar to that used in the construction of the flow-control baffle 28.

FIG. 4 is a sectional view of a flow-control baffle 28 for a catalytic converter wherein the openings 34 consist of collared holes. These collared openings 34 may be circularly shaped or they may be oblong slots. If collared openings of the kind illustrated in FIG. 4 are used, it is preferred that the exhaust gases flow in the direction illustrated so that they do not impinge upon sharp edges prior to passing through the baffle.

It is preferred that the openings in the flow-control baffle 28, and also in the upstream catalyst retention baffle 22, be formed such that the surfaces defining the perimeters of the openings are substantially parallel to the desired direction of exhaust gas flow. This type of construction for the openings 34 contributes substantially to a reduction of exhaust gas turbulence which is believed to be the primary cause of attrition of the particulate catalytic material.

The spacing of the flow-control baffle 28 from the upstream catalyst retention baffle 22 is not critical in most cases. The exact spacing depends upon the overall catalytic converter design, the size and shape of the flow channel in the converter housing, and upon the design of the catalyst bed or beds.

Figure 6:
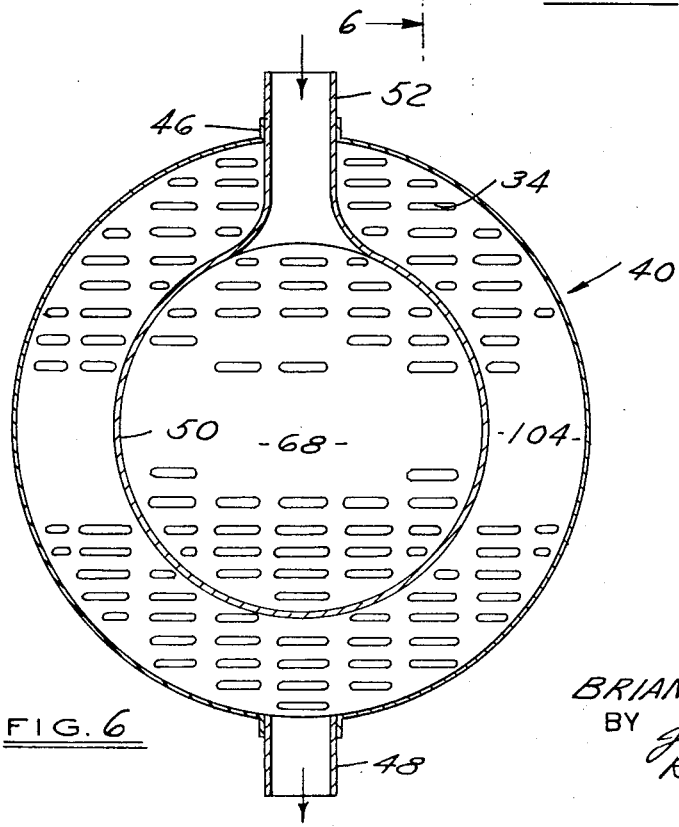
FIG. 6 is a sectional view taken along the line 6—6 in FIG. 5.

With particular reference now to FIGS. 5 and 6, there are shown sectional views of a multiple-bed catalytic converter having incorporated in its design the improvements of the invention intended to reduce catalyst attrition. The catalytic converter comprises a cylindrical outer housing 40 closed by sidewalls 42 and 43. Sidewalls 42 and 43 curve outwardly or balloon at the radial extremities as designated by numerals 44 and 45. An inlet opening 46 is located in the approximate center of the cylindrical portion of the outer housing 40, and an outlet opening 48 is located in the cylindrical portion diametrically opposite the inlet opening 46.

A cylindrical inner housing 50 is located centrally within the outer housing 40. An inlet tube 52 connects with the interior of the inner housing 50 and extends through the inlet opening 46 of the outer housing 40. The cylindrical inner housing 50 comprises a part of the flow channel between the exhaust gas inlet opening 52 and the exhaust gas outlet opening 48. Positioned within the cylindrical inner housing 50 are upstream gas-permeable catalyst retention baffles 54 and 56. Spaced from these upstream baffles 54 and 56 are, respectively, downstream gas-permeable catalyst retention baffles 58 and 60. Catalyst beds 62 and 64 formed from particulate material occupy the spaces, respectively, between the upstream and downstream catalyst retention baffles 54 and 58 and between the upstream and downstream catalyst retention baffles 56 and 60.

Positioned within the cylindrical inner housing 50 between, and spaced from both, the upstream catalyst retention baffle 54 and the inlet 52 is a flow-control baffle 66 having openings therein of the type previously described in connection with FIGS. 1 through 4. Similarly, a flow-control baffle 68 is positioned between, and spaced from both, upstream catalyst retention baffle 56 and the inlet 52. Typically, the catalytic material used in the beds 62 and 64 would be such as to promote the reduction of nitrogen oxides in motor vehicle exhaust gases.

The ends 70 and 72 of the cylindrical inner housing 50 terminate a short distance from the sidewalls 42 and 43 of the outer housing 40 and radially outward of the inner end of the balloon sections 44 and 45. A plate 74 is positioned adjacent the exterior of the flat portion of the sidewall 42 to define an air space 76 therebetween. Similarly, a plate 78 is positioned adjacent the exterior of the flat portion of the sidewall 43 to define an air space 80 therebetween. The plates 74 and 78 form air-tight seals where they intersect respective balloon portions 44 and 45. A tube 82 connects with the center portion of the plate 74, and a similar tube 84 connects with the center portion of the plate 78. The tubes 82 and 84 are brought together in a Y-section 86 that is supplied with air by an engine driven air pump (not shown).

A plurality of small openings 88 are formed in the balloon portions 44 and 45 at the approximate radial level of the cylindrical inner housing 50. These openings connect the air spaces 76 and 80, respectively, with spaces 90 and 92 in the exhaust gas flow channel. The axes of the openings 88 preferably are substantially parallel to the radii of the flat portions of the end walls 42 and 43, but can turn inwardly to a considerable extent if desired.

Radially outward of the cylindrical inner housing 50 are toroidally shaped catalyst beds 94 and 96. Catalyst beds 94 and 96 occupy the spaces, respectively, defined between an upstream catalyst retention baffle 98 and a downstream baffle 100 and between an upstream catalyst retention baffle 102 and a downstream baffle 104. The particulate catalytic material used in the catalyst beds 94 and 96 typically would be intended for the oxidation of exhaust gas constituents. Flow-control baffles 106 and 108, constructed as previously described, are located within the converter housing flow channel and are spaced from the upstream baffles 98 and 102, respectively, to reduce attrition of the catalyst beds 94 and 96.

In operation, exhaust gases emanating from an internal combustion engine enter the converter through the inlet 52, pass through the flow-control baffles 66 and 68, and are distributed across the facial areas of the catalyst beds 62 and 64. Gases exiting from these catalyst beds pass through the downstream baffles 58 and 60 and flow radially outwardly in spaces 90 and 92.

As the gases pass the edges 70 and 72 of the cylindrical inner housing 50, they mix with supplemental air supplied through holes 88. The secondary air has a flow component parallel to the gas flow direction when it enters the spaces 90 and 92. This prevents backflow of the air and exhaust gases and promotes smooth and uniform mixing thereof.

The mixture of air and exhaust gases passes through flow-control baffles 106 and 108 and enters the toroidally shaped particulate catalyst beds 94 and 96. The supplemental air aids in the oxidation of unburned hydrocarbons and carbon monoxide.

In some cases, it is possible to achieve a reasonable reduction of catalyst attrition by use only of the flow-control baffles 66 and 68, thus eliminating the use of the flow-control baffles 106 and 108. Also, in situations in which unequal thermal expansion of the catalytic converter parts is likely to occur, it is considered desirable to construct the flow-control and upstream and downstream baffles with a slight curvature. In this manner, the thermally expanding baffles are given a preferred direction of movement.

Based upon the foregoing description of the invention, what is claimed and desired to be protected by Letters Patent is:

1. A catalytic converter for the purification of exhaust gases emanating from an internal combustion engine, which comprises: a housing having an inlet for the admission of exhaust gases into said converter and having an outlet to permit exhaust gases to exit therefrom, said housing including means defining a flow channel between said inlet and said outlet; an upstream catalyst retention baffle positioned within said flow channel for the retention of a particulate catalytic material, said upstream baffle having a plurality of substantially uniformly spaced openings therein which extend completely therethrough; a downstream catalyst retention baffle positioned between said upstream baffle and said housing outlet and within said flow channel for the retention of a particulate catalytic material, said downstream baffle having a plurality of substantially uniformly spaced openings therein which extend completely therethrough; a particulate catalytic material in the space defined between said upstream baffle and said downstream baffle; and a flow-control baffle positioned within said flow channel between and spaced from both said housing inlet and said up-stream baffle, said flow-control baffle having a plurality of substantially uniformly spaced openings therein which extend completely therethrough, said flow-control baffle openings being circular in shape and having a diameter of less than about one-eighth of an inch, said openings being present over substantially the entire flow-control-baffle surface area and creating therein a total open area of at least about 25 percent of the total surface area of said flow-control baffle, said surface area of said flow-control baffle being equal to the surface area of said upstream baffle, and the surfaces defining the perimeters of said flow-control-baffle openings being parallel to the direction of exhaust gas flow through said upstream baffle.

2. A catalytic converter for the purification of exhaust gases emanating from an internal combustion engine, which comprises: a housing having an inlet for the admission of exhaust gases into said converter and having an outlet to permit exhaust gases to exit therefrom, said housing including means defining a flow channel between said inlet and said outlet; an upstream catalyst retention baffle positioned within said flow channel for the retention of a particulate catalytic material, said upstream baffle having a plurality of substantially uniformly spaced openings therein which extend completely therethrough; a downstream catalyst retention baffle positioned between said upstream baffle and said housing outlet and within said flow channel for the retention of a particulate catalytic material, said downstream baffle having a plurality of substantially uniformly spaced openings therein which extend completely therethrough; a particulate catalytic material in the space defined between said upstream baffle and said downstream baffle; and a flow-control baffle positioned within said flow channel between and spaced from both said housing inlet and said upstream baffle, said flow-control baffle having a plurality of substantially uniformly spaced openings therein which extend completely therethrough, said flow-control baffle openings being oblong in shape and having a width of about 0.050 of an inch, said openings being present over substantially the entire flow-control baffle surface area and creating therein a total open area of at least about 25% of the total surface area of said flow-control baffle, said surface area of said flow-control baffle being equal to the surface area of said upstream baffle, and the surfaces defining the perimeters of said flow-control-baffle openings being parallel to the direction of exhaust gas flow through said upstream baffle.

* * * * *